United States Patent
Ding et al.

(10) Patent No.: US 8,180,033 B2
(45) Date of Patent: May 15, 2012

(54) TELEPHONE DEVICE, TELEPHONE LINE MONITORING DEVICE AND METHOD

(75) Inventors: Lin-Kun Ding, Shenzhen (CN);
Shih-Fang Wong, Taipei Hsien (TW);
Xiang-Ping Zhou, Shenzhen (CN);
Jiang-Feng Shan, Shenzhen (CN);
Gui-Rong Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1072 days.

(21) Appl. No.: 12/099,172

(22) Filed: Apr. 8, 2008

(65) Prior Publication Data

US 2009/0052653 A1 Feb. 26, 2009

(30) Foreign Application Priority Data

Aug. 22, 2007 (CN) .......................... 2007 1 0201434

(51) Int. Cl.
*H04M 3/00* (2006.01)
(52) U.S. Cl. ...................................... 379/189; 379/401
(58) Field of Classification Search ............... 379/7, 188, 379/189, 199, 200, 401, 190, 191, 194
See application file for complete search history.

(56) References Cited

U.S. PATENT DOCUMENTS

| | | | |
|---|---|---|---|
| 3,777,069 A * | 12/1973 | Lee | 379/376.02 |
| 4,599,492 A | 7/1986 | Otten | |
| 5,559,874 A * | 9/1996 | Panosh | 379/189 |
| 6,429,779 B1 * | 8/2002 | Petrillo et al. | 340/644 |
| 6,697,472 B1 * | 2/2004 | Jordan et al. | 379/144.03 |
| 6,914,968 B1 * | 7/2005 | Ryley et al. | 379/188 |

\* cited by examiner

*Primary Examiner* — Md S Elahee
*Assistant Examiner* — Akelaw Teshale
(74) *Attorney, Agent, or Firm* — Altis Law Group, Inc.

(57) ABSTRACT

A telephone line monitoring device is connected to a telephone line and adjacent to a telephone device using the telephone line. The telephone line monitoring device includes a rectifying circuit for generating a corresponding direct current voltage according to an effective voltage of the telephone line; a first controller for generating a first control signal when the direct current voltage is lower than a predetermined voltage; a second controller for detecting an operating state of the telephone device and generating a second control signal when the telephone device is operated; a load booster for pulling down the effective voltage of the telephone line when enabled; and a first switch circuit for disabling the load booster whenever receiving the second control signal, and enabling the load booster when receiving the first control signal while not receiving the second control signal. A monitoring method and a telephone device are also provided.

20 Claims, 6 Drawing Sheets

TELEPHONE DEVICE, TELEPHONE LINE MONITORING DEVICE AND METHOD

BACKGROUND

1. Field of the Invention

The present invention relates to landline telephones, and particularly to a landline telephone line monitoring device and method for preventing a telephone line of a landline telephone device from being used by an unauthorized person.

2. Description of Related Art

Landline telephone devices are ubiquitous. A landline telephone device uses wiring to convey sound information from one landline telephone device to another landline telephone device or to convey sound information to a mobile phone via a wired and a wireless network. However, the wiring, of landline telephones, is usually exposed outside of buildings, thus the wiring can be surreptitiously tapped into by an unauthorized person. Referring to FIG. 6, an illicit phone connected to a telephone line at an outdoor location is shown. Thus, an unauthorized person would be able to use the telephone services of the legitimate subscriber of the telephone line, while the legitimate subscriber is liable for all the service payments.

Therefore, an improved telephone device, a telephone line monitoring device and method are needed to address the aforementioned deficiency and inadequacies.

SUMMARY

A telephone line monitoring device for preventing a telephone line from being tapped illicitly is provided herein. The telephone line monitoring device is connected to a telecommunications network via the telephone line, and is adjacent to a telephone device using the telephone line. The telephone line monitoring device includes a rectifying circuit, a first controller, a second controller, a load booster, and a first switch circuit. The rectifying circuit is used for generating a corresponding direct current voltage according to an effective voltage of the telephone line. The first controller is configured for generating a first control signal when the direct current voltage is lower than a predetermined voltage. The second controller is configured for detecting an operating state of the telephone device and generating a second control signal when the telephone device is operated. The load booster is used for pulling down the effective voltage of the telephone line when enabled. The first switch circuit is configured for disabling the load booster whenever receiving the second control signal, and enabling the load booster when receiving the first control signal while not receiving the second control signal. A related telephone line monitoring method and a telephone device are also provided.

Other advantages and novel features of the present invention will become more apparent from the following detailed description of preferred embodiment when taken in conjunction with the accompanying drawings.

DETAILED DESCRIPTION OF THE EMBODIMENTS

Reference will now be made to the drawings to describe a preferred embodiment of the present telephone device, the telephone line monitoring device and method.

Figure 1:
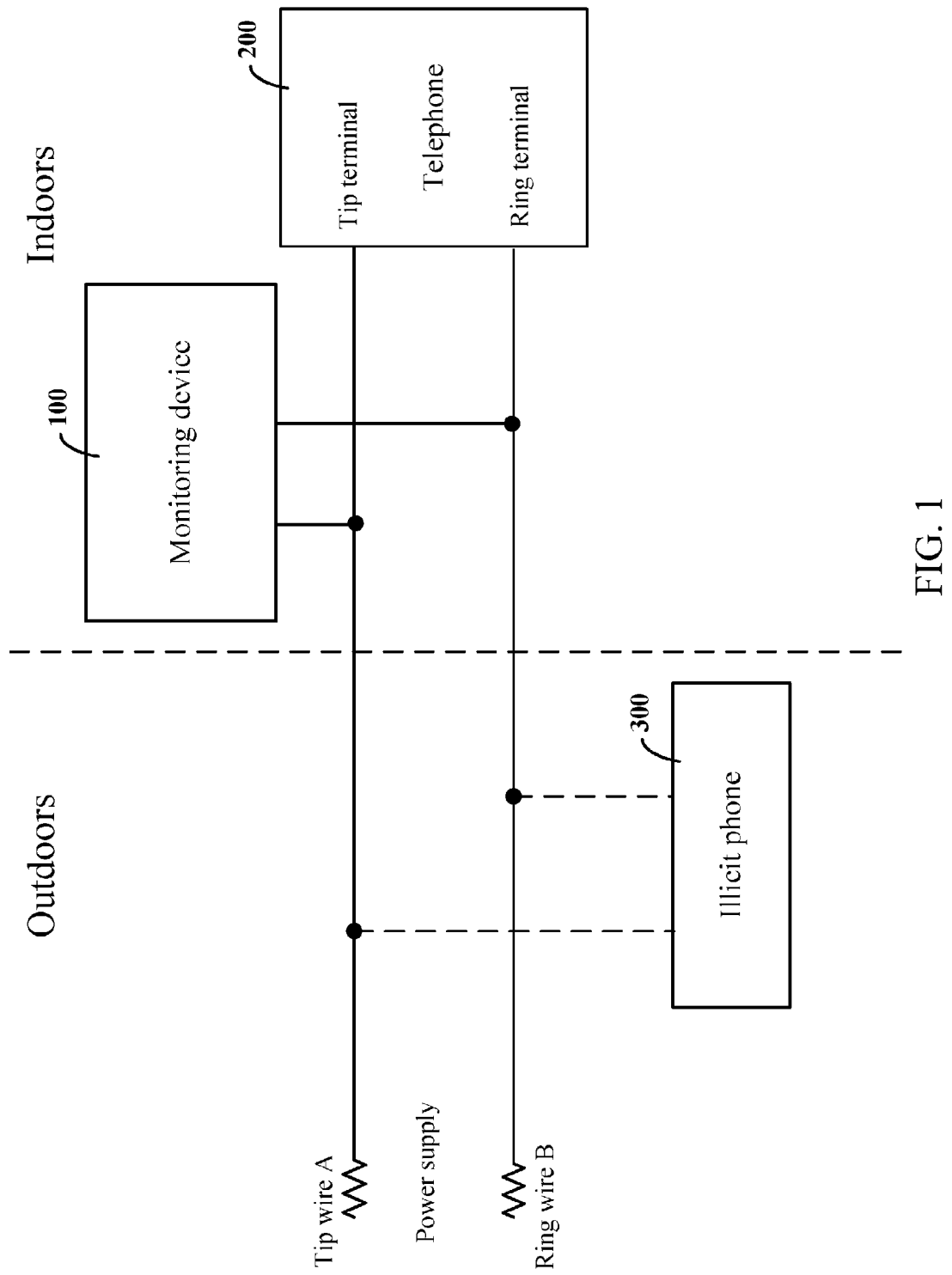
FIG. 1 illustrates a block diagram showing a telephone system including a telephone line monitoring device in accordance with a first exemplary embodiment.

Referring to FIG. 1, in a first exemplary embodiment, a telephone system includes a landline telecommunication device (telephone for short) 200 placed indoors and connected to a telecommunications network (not shown) via a telephone line (phone line for short). The phone line powered by a power supply include a tip wire A and a ring wire B. The tip wire A is connected to a tip terminal of the telephone 200. The ring wire B is connected to a ring terminal of the telephone 200. An illicit phone 300 is connected to the phone line. The telephone system further includes a telephone line monitoring device 100 (monitoring device for short) connected to the phone line and adjacent to the telephone 200.

The monitoring device 100 is configured for preventing the phone line from being used by the illicit phone 300, and generating an audible alarm when detecting the illicit phone 300. When the illicit phone 300 is in use, a value of the effective voltage applied to the phone line changes, from −50 volts to −9 volts, for example. So, when the effective voltage drops and the telephone 200 is not in use (being operated), this may indicate that the illicit phone 300 is in use. In the embodiment, the monitoring device 100 pulls down the effective voltage applied to the phone line, and outputs the audible alarm when detecting the illicit phone 300. The pulled down effective voltage is low enough to affect operation of the illicit phone 300, and may even affect normal operations of any additional phone devices connected to the phone line.

Figure 2:
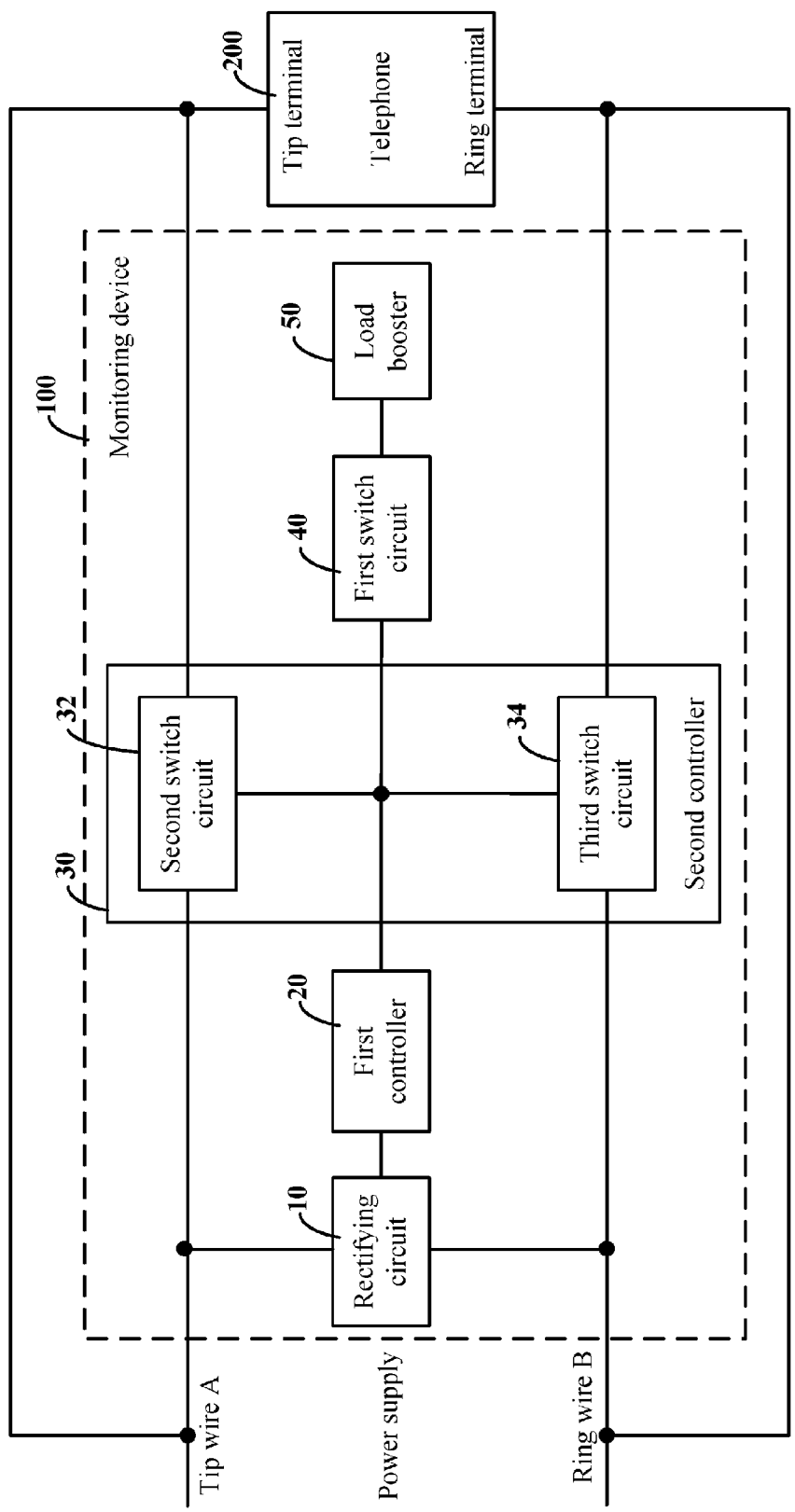
FIG. 2 is a detailed block diagram of the telephone line monitoring device.
Figure 3:
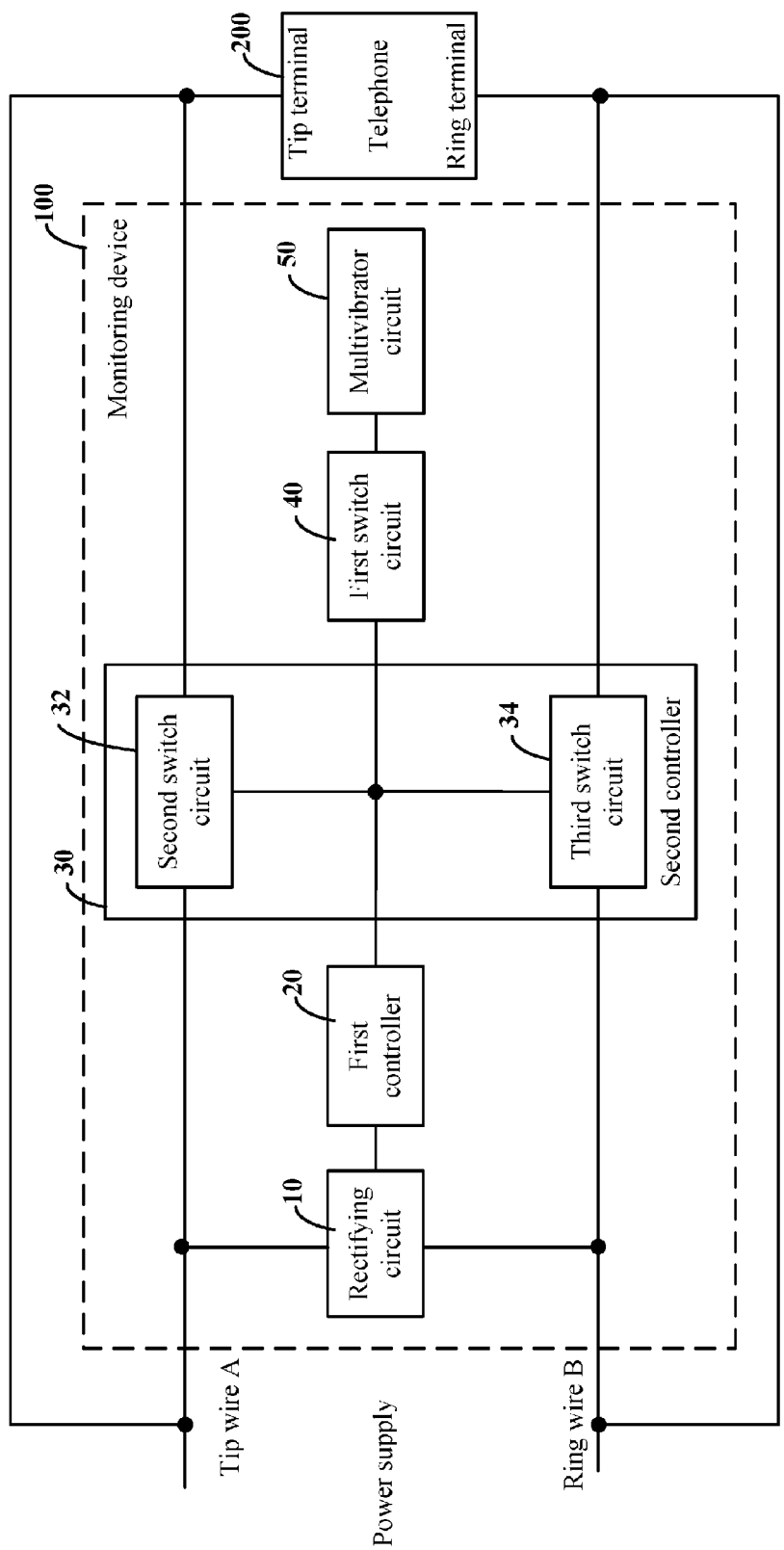
FIG. 3 is another detailed block diagram of the telephone line monitoring device.

Referring to FIGS. 2 and 3, the monitoring device 100 includes a rectifying circuit 10, a first controller 20, a second controller 30, a first switch circuit 40, and a load booster 50.

The rectifying circuit 10 is configured for generating a corresponding direct current (DC) voltage according to an effective voltage of the phone line. In operation, when the phone line is free or in use, a negative DC power supply powers the phone line, the rectifying circuit 10 converts the negative DC voltage into a positive DC voltage. When there is an incoming call, an alternating current (AC) ringing voltage (75 volts for example) is supplied to the phone line so as to ring a bell (not shown) in the telephone 200, the rectifying circuit 10 converts the AC ringing voltage into a corresponding DC voltage.

The first controller 20 is configured for generating a first control signal when the DC voltage outputted by the rectifying circuit 10 is lower than a predetermined voltage. The second controller 30 is configured for detecting an operating state of the telephone 200 and generating a second control signal when the telephone 200 is being operated. The method for detecting the operating state of the telephone 200 may include step of detecting an on/off state of a hookswitch of the telephone 200, or detecting whether there is current flowing through the telephone 200, etc. When the hookswitch of the telephone 200 is closed (on-state), this means that the telephone 200 is being operated. When there is a current flowing through the telephone 200, this also means that the telephone 200 is being operated. In the exemplary embodiment, the method for detecting the operating state of the telephone 200 is to detect whether there is a current flowing through the telephone 200.

The load booster 50 is configured for pulling down the effective voltage of the phone line when enabled. The load booster 50 is a high voltage powered electrical device. In the exemplary embodiment, the load booster 50 is a multivibrator circuit with an electro-acoustic transducer.

The first switch circuit 40 is configured for disabling the load booster 50 when receiving the second control signal, and enabling the load booster 50 when receiving the first control signal while not receiving the second control signal. That is, the first switch circuit 40 disables the load booster 50 when the telephone 200 is being operated, and enables the load booster 50 so as to prevent the illicit phone 300 from being operated.

Figure 4:
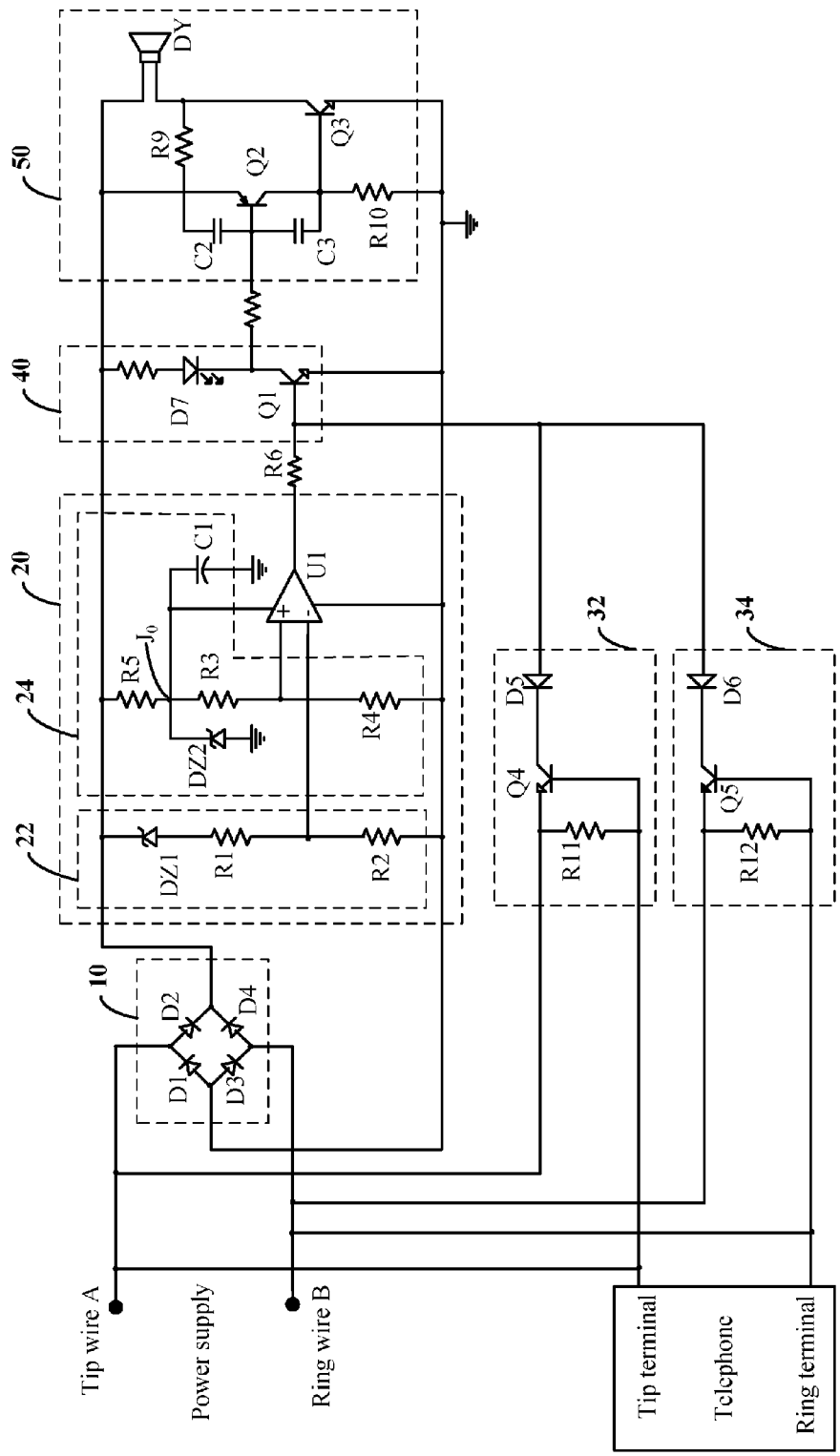
FIG. 4 is a circuit of the telephone line monitoring device of FIG. 3.

Referring to FIG. 4, the rectifying circuit 10 includes four diodes D1, D2, D3, D4 that form a full-bridge rectifier.

The first controller 20 includes a sampling circuit 22, a comparator U1, and a reference voltage circuit 24. The sampling circuit 22 includes a first zener diode DZ1, a first resistor R1, and a second resistor R2. A cathode of the first zener diode DZ1 is connected to the rectifying circuit 10, and an anode of the first zener diode DZ1 is connected to the an end of the first resistor R1. Another end of the first resistor R1 is connected to an end of the second resistor R2 and the inverting input terminal of the comparator U1. Another end of the second resistor R2 is grounded. The reference voltage circuit 24 includes a second zener diode DZ2, a first capacitor C1, a third, a fourth, and a fifth resistors R3, R4, R5. An end of the fifth resistor R5 is connected to the rectifying circuit 10, and another end of the fifth resistor R5 is connected to a cathode of the second zener diode DZ2, an end of the third resistor R3, and the anode of the first capacitor C1. An anode of the second zener diode DZ2, and a cathode of the first capacitor C1 are grounded. Another end of the third resistor R3 is connected to an end of the fourth resistor R4 and the non-inverting input terminal of the comparator U1. Another end of the fourth resistor R4 is grounded. An output terminal of the comparator U1 is connected to the second controller 30 and the first switch circuit 40 via a sixth resistor R6. A zener voltage of the first zener diode DZ1 should be lower than the high voltage of the phone line, and higher than the low voltage of the phone line. A zener voltage of the second diode DZ2 should be lower than the low voltage of the phone line.

The second controller 30 includes a second switch circuit 32 and a third switch circuit 34. The second switch circuit 32 includes a fifth diode D5, an eleventh resistor R11, and an NPN type fourth bipolar junction transistor (BJT) Q4. An emitter of the fourth BJT Q4 is connected to the tip wire A of the phone line and an end of the eleventh resistor R11, a base of the fourth BJT Q4 is connected to the tip terminal of the telephone 200 and another end of the eleventh resistor R11. A collector of the fourth BJT Q4 is connected to a cathode of the fifth diode D5, and an anode of the fifth diode D5 is connected to the first switch circuit 40. The third switch circuit 34 includes a sixth diode D6, a twelfth resistor R12, and an NPN type fifth BJT Q5. An emitter of the fifth BJT Q5 is connected to the ring wire B and an end of the twelfth resistor R12, and a base of the fifth BJT Q5 is connected to the ring terminal of the telephone 200 and another end of the twelfth resistor R12. A collector of the fifth BJT Q5 is connected to a cathode of the sixth diode D6, and an anode of the sixth diode D6 is connected to the first switch circuit 40.

The first switch circuit 40 includes an NPN type first BJT Q1 and a light-emitting diode (LED) D7. The base of the first BJT Q1 is connected to the first controller 20 and the second controller 30, the emitter of the first BJT Q1 is grounded, and the collector of the first BJT Q1 is connected to a cathode of the LED D7 and the multivibrator circuit 50. An anode of the LED D7 is connected to the rectifying circuit 10 via a resistor.

The multivibrator circuit 50 includes a second capacitor C2, a third capacitor C3, a ninth resistor R9, a tenth resistor R10, a PNP type second BJT Q2, an NPN type third BJT Q3, and an electro-acoustic transducer DY. A base of the second BJT Q2 is connected to the first switch circuit 40 via a resistor, an emitter of the second BJT Q2 is connected to the rectifying circuit 10, and a collector of the second BJT Q2 is grounded via the tenth resistor R10. The second capacitor C2 and the ninth resistor R9 are connected in series between the base of the second BJT Q2 and a collector of the third BJT Q3. The third capacitor C3 is connected between the base and collector of the second BJT Q2. A base of the third BJT Q3 is connected to the collector of the second BJT Q2, the collector is connected to a terminal of the electro-acoustic transducer DY, and an emitter is grounded. The other terminal of the electro-acoustic transducer DY is connected to the rectifying circuit 10. In the exemplary embodiment, the electro-acoustic transducer DY is a loud speaker.

In the exemplary embodiment, the effective voltage (absolute value) of the DC voltage is a high voltage, about 50 volts, when the phone line is free, and a low voltage, about 9 volts, when the phone line is busy (the phone is being operated). In the first controller 20, a zener voltage of the first zener diode DZ1 is 12 volts, a resistance of the first resistor R1 is 800 kilohms, a resistance of the second resistor R2 is 100 kilohms, a zener voltage of the second zener diode DZ2 is 5 volts, a resistance of the third resistor R3 is 100 kilohms, and a resistance of the fourth resistor R4 is 50 kilohms. Thus, a threshold voltage V1 of the comparator U1 can be calculated according to the following formula (1):

$$V1 = 5 \text{ volts} * R4/(R3+R4) = 5 \text{ volts} * 50/(50+100) = 1.67 \text{ volts} \quad (1)$$

In operation, when the phone line is free, the effective voltage (absolute value) of the phone line is 50 volts. The DC voltage outputted by the rectifying circuit 10 is 50 volts too, higher than the zener voltage of the first zener diode DZ1. Thus, the first zener diode DZ1 is enabled (turned on), the voltage at the node between the first zener diode DZ1 and the first resistors R1 equals to 38 volts (that is 50 volts minus 12 volts), and the voltage at the node between the first resistor R1 and the second resistor R2 and the inverting input terminal of the comparator U1 equals to about 4.22 volts, in other words, higher than the threshold voltage of the comparator U1. As a result, the comparator U1 outputs a low voltage that is nearly 0 volts, the first BJT Q1 is disabled (turned off), and the multivibrator circuit 50 is disabled.

When the phone line is used, the effective voltage of the phone line reduces to 9 volts. The DC voltage outputted by the rectifying circuit 10 is 9 volts too, lower than the zener voltage of the first zener diode DZ1. Thus, the first zener diode DZ1 is disabled, a voltage supplied to the inverting input terminal of the comparator U1 equals to 0 volts, in other words, lower than the threshold voltage of the comparator U1. As a result, the comparator U1 outputs a high voltage (that is the first control signal) that is nearly 5 volt.

If the telephone 200 is being operated, a current flows through the tip terminal and the ring terminal of the telephone 200, and because one wire of the phone line (the tip wire A or the ring wire B) is always lower than or equals to 0 volts at any time, one of the BJTS Q4, Q5 is enabled. Thus, a voltage supplied to the base of the first BJT Q1 is pulled down to 0 volts or lower (this is the second control signal). As a result, the first BJT Q1 is disabled, and the multivibrator circuit 50 is disabled.

When the phone line is used by the illicit phone 300, and the telephone 200 is not operated, there is no current flowing through the tip terminal and the ring terminal of the telephone 200, the BJTS Q4, Q5 will not become enabled (turn on). Thus, the 5 volts voltage outputted by the comparator U1 is transmitted through the sixth resistor R6 to the base of the first BJT Q1. The first BJT Q1 is enabled, as a result, the LED D7 emits light to indicate that the phone line is used by the illicit phone 300, and furthermore, a low voltage that equals to 0 volts is transmitted to the base of the second BJT Q2. As a result, the BJTS Q2, Q3 is enabled, the multivibrator circuit 50 begins to work, and the electro-acoustic transducer DY is enabled to output an audible alarm to alert that there might be an illicit telephone tapped-in to the phone line. Meanwhile, the effective voltage of the phone line is pulled down so as to prevent the illicit phone 300 from being operated. The pulled down effective voltage is lowered such that it cannot drive any telephones.

In other embodiments, any of the BJTS can be replaced by other controllable switches, such as Field-Effect Transistors (FETs). The LED D7 can be omitted.

Figure 5:
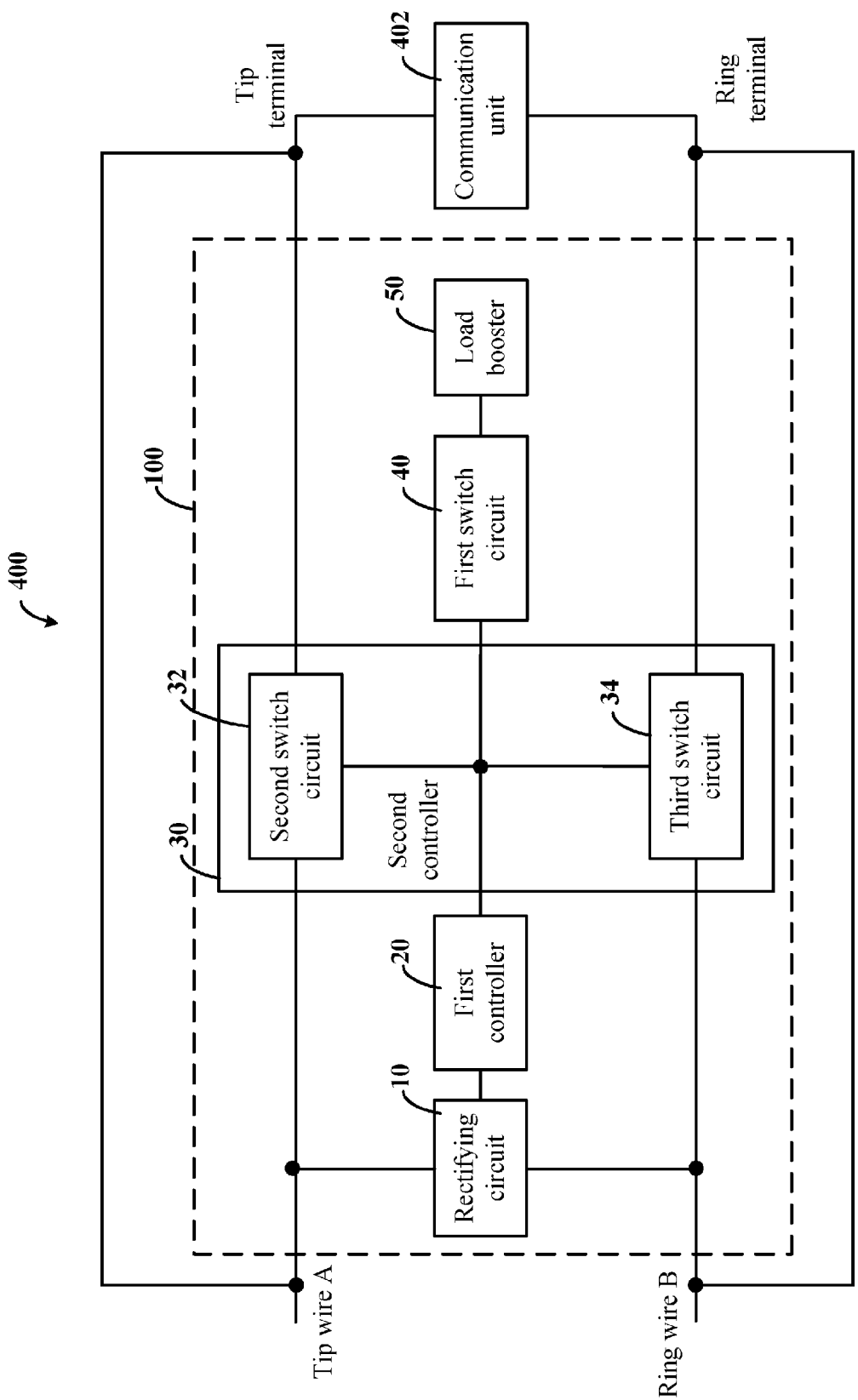
FIG. 5 illustrates a block diagram showing a telephone device in accordance with a second exemplary embodiment.
Figure 6:
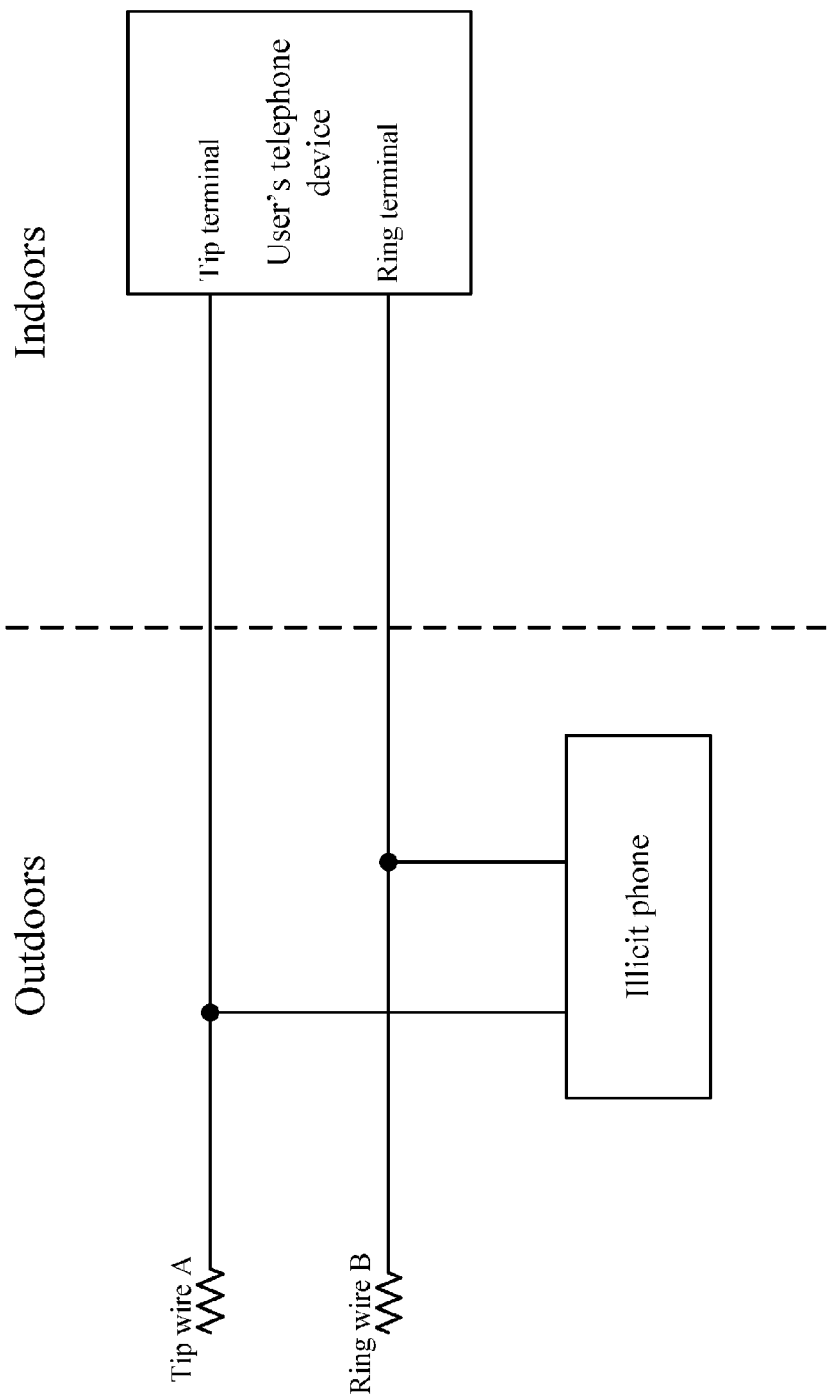
FIG. 6 illustrates a block diagram showing a conventional telephone system, wherein the telephone line is used by an illicit telephone.

Referring to FIG. 5, in a second exemplary embodiment, the monitoring device 100 is integrated in a telephone 400. The monitoring device is connected to a communication unit 402 of the telephone 400.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A telephone line monitoring device, connected to a telecommunications network via a telephone line, and adjacent to a telephone device using the telephone line, for preventing the telephone line from being used illicitly, the telephone line monitoring device comprising:
   a rectifying circuit for generating a corresponding direct current voltage according to an effective voltage of the telephone line;
   a first controller for generating a first control signal when the direct current voltage is lower than or equal to a predetermined voltage;
   a second controller for detecting an operating state of the telephone device and generating a second control signal when the telephone device is being operated;
   a load booster for pulling down the effective voltage of the telephone line when enabled; and
   a first switch circuit for disabling the load booster when receiving the second control signal, and enabling the load booster when receiving the first control signal while not receiving the second control signal;
   wherein the first controller comprises a sampling circuit, a comparator, and a reference voltage circuit; the sampling circuit is connected between the rectifying circuit and an inverting input terminal of the comparator, the reference voltage circuit is connected to an non-inverting input terminal of the comparator, and an output terminal of the comparator is connected to the second controller and the first switch circuit.

2. The telephone line monitoring device as described in claim 1, wherein the load booster comprises an electro-acoustic transducer for generating an audible alarm when the load booster is enabled.

3. The telephone line monitoring device as described in claim 1, wherein the sampling circuit comprises a first zener diode, a first resistor, and a second resistor; a cathode of the first zener diode is connected to the rectifying circuit, an anode of the first zener diode is connected to an end of the first resistor, another end of the first resistor is connected to an end of the second resistor and the inverting input terminal of the comparator, another end of the second resistor is grounded.

4. The telephone line monitoring device as described in claim 3, wherein the reference voltage circuit comprises a second zener diode, a first capacitor, a third, a fourth, and a fifth resistor; an end of the fifth resistor is connected to the rectifying circuit; another end of the fifth resistor is connected to a cathode of the second zener diode, an end of the third resistor, and the anode of the first capacitor; an anode of the second zener diode is grounded, a cathode of the first capacitor is grounded, another end of the third resistor is connected to an end of the fourth resistor and the non-inverting input terminal of the comparator, another end of the fourth resistor is grounded.

5. The telephone line monitoring device as described in claim 1, wherein the second controller comprises a second switch circuit comprising a fifth diode, a eleventh resistor, and a fourth bipolar junction transistor; an emitter of the fourth bipolar junction transistor is connected to one of the telephone line and an end of the eleventh resistor, a base of the fourth bipolar junction transistor is connected to a first terminal of the telephone device and another end of the eleventh resistor, a collector of the fourth bipolar junction transistor is connected to a cathode of the fifth diode, an anode of the fifth diode is connected to the first switch circuit.

6. The telephone line monitoring device as described in claim 5, wherein the second controller further comprises a third switch circuit comprising a sixth diode, a twelfth resistor, and a fifth bipolar junction transistor; an emitter of the fifth bipolar junction transistor is connected to the other of the telephone line and an end of the twelfth resistor, a base of the fifth bipolar junction transistor is connected to a second terminal of the telephone device and another end of the twelfth resistor, a collector of the fifth bipolar junction transistor is connected to a cathode of the sixth diode, an anode of the sixth diode is connected to the first switch circuit.

7. The telephone line monitoring device as described in claim 1, wherein the first switch circuit comprises a first bipolar junction transistor and a light-emitting diode, the base of the first bipolar junction transistor is connected to the first controller and the second controller, the emitter of the first bipolar junction transistor is grounded, the collector of the first bipolar junction transistor is connected to a cathode of the light-emitting diode and the multivibrator circuit, an anode of the light-emitting diode is connected to the rectifying circuit via a resistor.

8. A telephone device connected to a telecommunications network via a telephone line, the telephone device comprising a telephone line monitoring unit for preventing the telephone line from being tapped illicitly, the telephone line monitoring unit comprising:
   a rectifying circuit for generating a corresponding direct current voltage according to an effective voltage of the telephone line;
   a first controller for generating a first control signal when the direct current voltage is lower than or equal to a predetermined voltage;
   a second controller for detecting an operating state of the telephone device and generating a second control signal when the telephone device is being operated;

a load booster for pulling down the effective voltage of the telephone line when enabled; wherein the pulled down effective voltage cannot drive any telephone devices; and a first switch circuit for disabling the load booster whenever receiving the second control signal, and enabling the load booster when receiving the first control signal while not receiving the second control signal;

wherein the first controller comprises a sampling circuit, a comparator, and a reference voltage circuit; the sampling circuit is connected between the rectifying circuit and an inverting input terminal of the comparator, the reference voltage circuit is connected to an non-inverting input terminal of the comparator, and an output terminal of the comparator is connected to the second controller and the first switch circuit.

9. The telephone device as described in claim 8, wherein the load booster comprises an electro-acoustic transducer for generating an audible alarm when the load booster is enabled.

10. The telephone line monitoring device as described in claim 8, wherein the sampling circuit comprises a first zener diode, a first resistor, and a second resistor; a cathode of the first zener diode is connected to the rectifying circuit, an anode of the first zener diode is connected to an end of the first resistor, another end of the first resistor is connected to an end of the second resistor and the inverting input terminal of the comparator, another end of the second resistor is grounded.

11. The telephone line monitoring device as described in claim 10, wherein the reference voltage circuit comprises a second zener diode, a first capacitor, a third, a fourth, and a fifth resistor; an end of the fifth resistor is connected to the rectifying circuit; another end of the fifth resistor is connected to a cathode of the second zener diode, an end of the third resistor, and the anode of the first capacitor; an anode of the second zener diode is grounded, a cathode of the first capacitor is grounded, another end of the third resistor is connected to an end of the fourth resistor and the non-inverting input terminal of the comparator, another end of the fourth resistor is grounded.

12. The telephone line monitoring device as described in claim 8, wherein the second controller comprises a second switch circuit comprising a fifth diode, a eleventh resistor, and a fourth bipolar junction transistor; an emitter of the fourth bipolar junction transistor is connected to one of the telephone line and an end of the eleventh resistor, a base of the fourth bipolar junction transistor is connected to a first terminal of the telephone device and another end of the eleventh resistor, a collector of the fourth bipolar junction transistor is connected to a cathode of the fifth diode, an anode of the fifth diode is connected to the first switch circuit.

13. The telephone line monitoring device as described in claim 12, wherein the second controller further comprises a third switch circuit comprising a sixth diode, a twelfth resistor, and a fifth bipolar junction transistor; an emitter of the fifth bipolar junction transistor is connected to the other of the telephone line and an end of the twelfth resistor, a base of the fifth bipolar junction transistor is connected to a second terminal of the telephone device and another end of the twelfth resistor, a collector of the fifth bipolar junction transistor is connected to a cathode of the sixth diode, an anode of the sixth diode is connected to the first switch circuit.

14. A telephone line monitoring method for preventing a telephone line connecting a telephone device to a telecommunications network from being tapped illicitly, the telephone line monitoring method comprising:

a rectifying circuit generating a corresponding direct current voltage according to an effective voltage of the telephone line;

a first controller generating a first control signal when the direct current voltage is lower than or equal to a predetermined voltage;

a second controller detecting an operating state of the telephone device; and a load booster pulling down the effective voltage of the telephone line when the direct current voltage is lower than or equal to a predetermined voltage while the telephone device is detected to be not in use;

wherein the first controller comprises a sampling circuit, a comparator, and a reference voltage circuit; the sampling circuit is connected between the rectifying circuit and an inverting input terminal of the comparator, the reference voltage circuit is connected to an non-inverting input terminal of the comparator, and an output terminal of the comparator is connected to the second controller and the load booster.

15. The telephone line monitoring method as described in claim 14, further comprising generating an audible alarm when the direct current voltage is lower than a predetermined voltage while the telephone device is not in use.

16. The telephone line monitoring method as described in claim 14, wherein a method for pulling down the effective voltage of the telephone line is to connect and enable a load booster to the telephone line.

17. The telephone line monitoring device as described in claim 14, wherein the sampling circuit comprises a first zener diode, a first resistor, and a second resistor; a cathode of the first zener diode is connected to the rectifying circuit, an anode of the first zener diode is connected to an end of the first resistor, another end of the first resistor is connected to an end of the second resistor and the inverting input terminal of the comparator, another end of the second resistor is grounded.

18. The telephone line monitoring device as described in claim 17, wherein the reference voltage circuit comprises a second zener diode, a first capacitor, a third, a fourth, and a fifth resistor; an end of the fifth resistor is connected to the rectifying circuit; another end of the fifth resistor is connected to a cathode of the second zener diode, an end of the third resistor, and the anode of the first capacitor; an anode of the second zener diode is grounded, a cathode of the first capacitor is grounded, another end of the third resistor is connected to an end of the fourth resistor and the non-inverting input terminal of the comparator, another end of the fourth resistor is grounded.

19. The telephone line monitoring device as described in claim 14, wherein the second controller comprises a second switch circuit comprising a fifth diode, a eleventh resistor, and a fourth bipolar junction transistor; an emitter of the fourth bipolar junction transistor is connected to one of the telephone line and an end of the eleventh resistor, a base of the fourth bipolar junction transistor is connected to a first terminal of the telephone device and another end of the eleventh resistor, a collector of the fourth bipolar junction transistor is connected to a cathode of the fifth diode, an anode of the fifth diode is connected to the first switch circuit.

20. The telephone line monitoring device as described in claim 18, wherein the second controller further comprises a third switch circuit comprising a sixth diode, a twelfth resistor, and a fifth bipolar junction transistor; an emitter of the fifth bipolar junction transistor is connected to the other of the telephone line and an end of the twelfth resistor, a base of the fifth bipolar junction transistor is connected to a second terminal of the telephone device and another end of the twelfth resistor, a collector of the fifth bipolar junction transistor is connected to a cathode of the sixth diode, an anode of the sixth diode is connected to the first switch circuit.

* * * * *